UNITED STATES PATENT OFFICE.

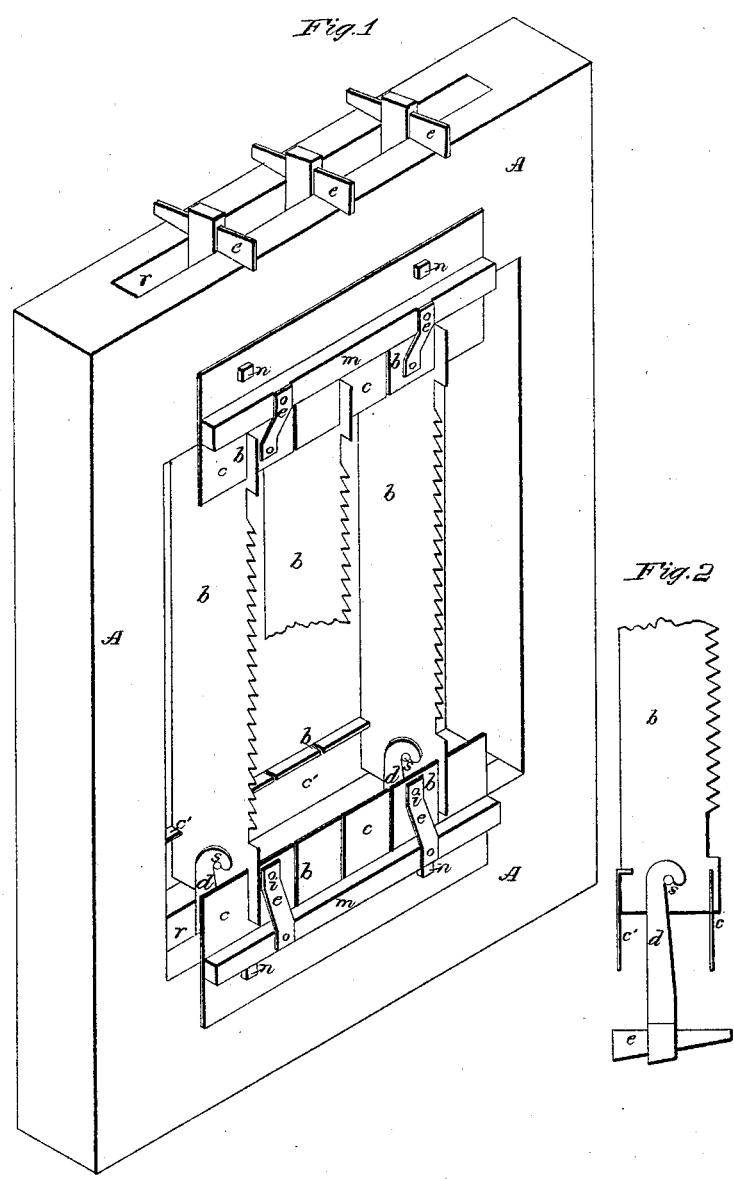

J. H. TOTMAN, OF PLATTSBURG, NEW YORK.

METHOD OF HANGING AND SECURING RECIPROCATING MILL-SAWS.

Specification of Letters Patent No. 31,498, dated February 19, 1861.

*To all whom it may concern:*

Be it known that I, J. H. TOTMAN, of Plattsburg, in the county of Clinton and in the State of New York, have invented a new and Improved Saw-Gate; and I do hereby declare that the following is a full and exact description thereof, reference being had to the accompanying drawings and to the letters of reference marked thereon.

Similar letters indicate the same parts in each figure.

The nature of my invention consists in a peculiar construction and combination of the several devices of a saw gate by which one or more of the saws may be removed from the gate without unstraining or disturbing the remaining ones, and by which the whole may be removed for the purpose of sharpening, and replaced again without danger of breaking any of the straining devices.

To enable others skilled in the art to make and use my invention, I will proceed to describe its construction and operation.

Figure 1 is an isometrical view of my saw gate. Fig. 2 is an elevation of the two gages, a hook, key, and a portion of a saw.

A is the saw frame; b, saw; c, front gage; c', rear gage; d, hooks; e, keys; l, braces; m, support for braces; n, bolts of gages; s, pins for holding saw; f, cuts through the gages into which the saws are placed.

By examining the drawings it may be seen that the rear gage c', has a lip bent upon its free edge which forms a right angle with the vertical portion of the gage. Through the lip or horizontal portion of this gage only, the cuts f, for holding the saw are made, and when the saw is in its place its back rests against the vertical portion of it.

The front gage c, has no lip upon it, but the vertical cut f extends far enough to let the saw pass through it. The hooks d, are double, coming down upon each side of the saw plate and taking hold upon pins s, which pass through the saw.

The upper and lower portion of the gate is formed of two bars between which the hooks d pass and are secured by keys e. When it becomes necessary to remove one saw for the purpose of repairing it the key of that saw must be driven back till the hook falls low enough for the pin to be disengaged from it, when the saw may be passed forward out of the gate through the gage c both at top and bottom. When it becomes necessary to remove all the saws in the gate for the purpose of sharpening, each alternate saw must first be removed and sharpened, and afterward, each other alternate saw treated in like manner.

The gages on gates in common use are constructed both front and rear like gage c', and consequently when it becomes necessary to remove a single saw from such a gate all the saws have first to be loosened and one of the gages entirely removed from the gate before the saw can be taken out. This not only occupies a great deal of time but it is attended with danger of breaking the hooks of the last few saws that are loosened, as the whole strain of the frame has to be sustained by them till their keys are finally driven back.

In my improved saw gate the frequent necessity for removing one or more saws occasions but little delay and is never attended with danger to the straining devices, as one half or two thirds of the saws may be kept strained all the time.

I have employed gages constructed both front and rear like gage c, but I have found that it is necessary that the back of the saw plate should rest against the vertical portion of the gage so as to prevent vibration of the saw. Otherwise the key immediately becomes loose.

I make no claim to the gages herein described as being in common use, either in their construction or combination with the other straining devices, but What I do claim, and desire to have secured to me by Letters Patent is—

The employment of the front gage c, the rear gage c', the hook d and key e, where these devices are constructed and operate in the manner and for the purpose specified.

J. H. TOTMAN.

Witnesses:
S. H. NORTON,
O. E. MILLER.